Nov. 1, 1927.  
W. LA HODNY ET AL  
1,647,803  
MIRROR BRACKET  
Filed May 5, 1925  
2 Sheets-Sheet 1
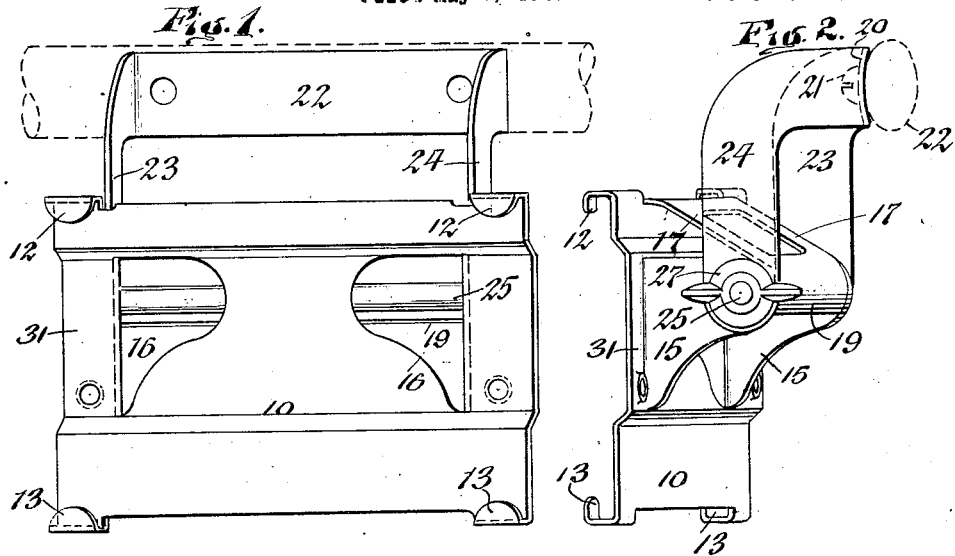
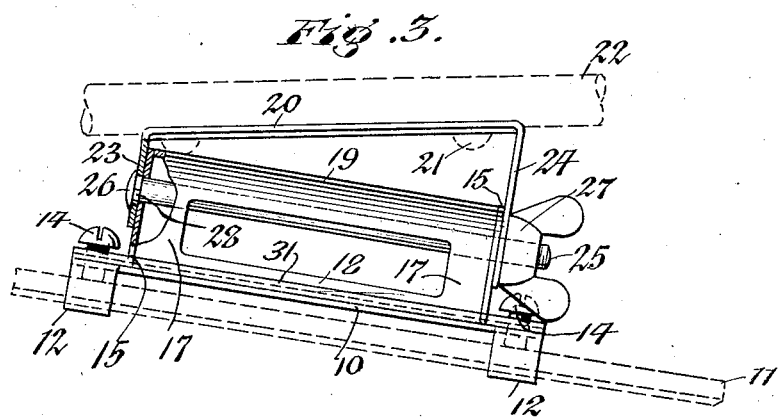
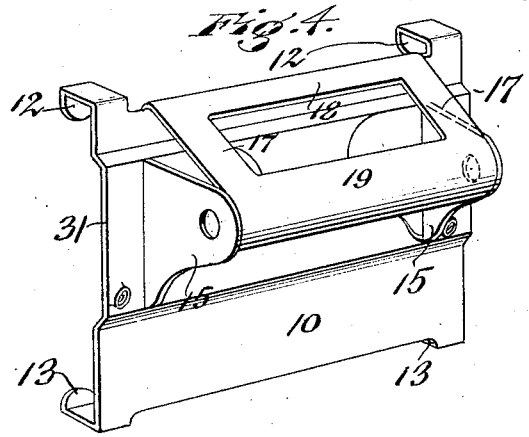
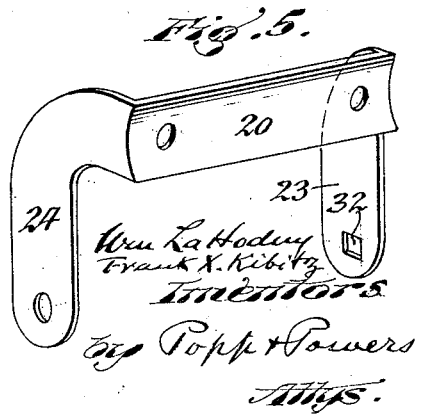

Nov. 1, 1927.
W. LA HODNY ET AL
MIRROR BRACKET
Filed May 5, 1925
1,647,803
2 Sheets-Sheet 2
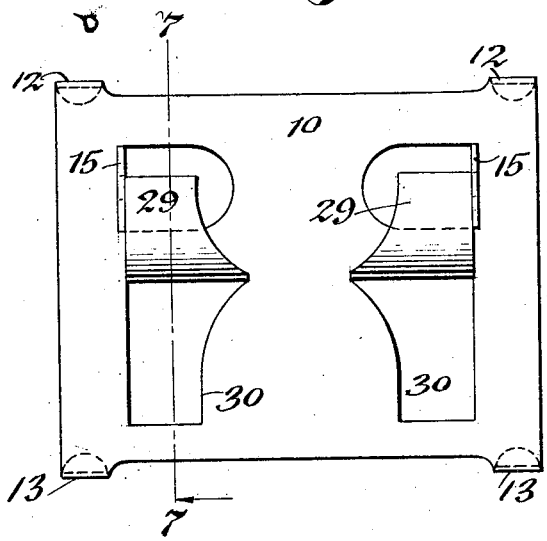
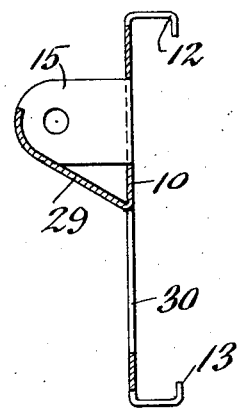
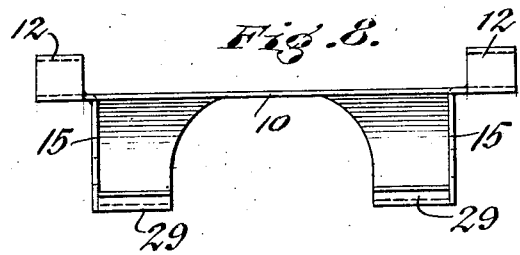
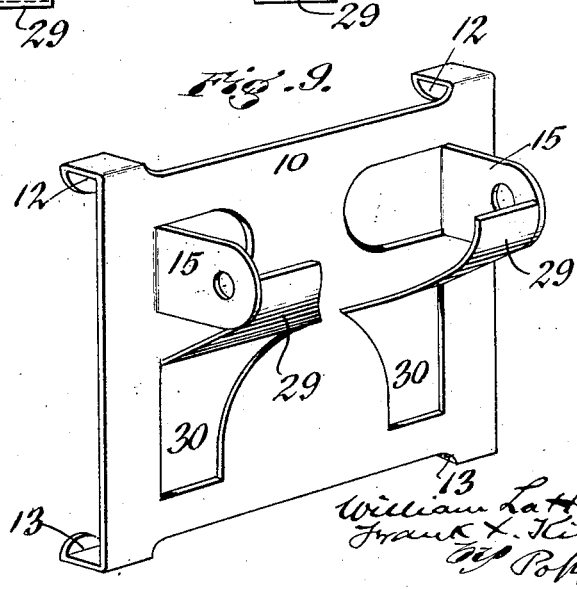

Patented Nov. 1, 1927.

1,647,803

UNITED STATES PATENT OFFICE.

WILLIAM LA HODNY AND FRANK X. KIBITZ, OF BUFFALO, NEW YORK, ASSIGNORS TO STANDARD MIRROR COMPANY, INC., OF BUFFALO, NEW YORK, A CORPORATION OF NEW YORK.

MIRROR BRACKET.

Application filed May 5, 1925. Serial No. 28,177.

This invention relates to a bracket which is more particularly intended for supporting a mirror on the windshield or other available support of an automobile in order to enable the driver to obtain a view of the road in rear of the car.

Heretofore, such brackets have usually been so constructed that they provided a plurality of adjustments which permitted not only of tilting the mirror up and down to suit the height of the person using the mirror but also permitted of adjusting the mirror horizontally into different angular positions so as to suit the location of the mirror on the automobile with reference to the driver. These numerous adjustments were necessary inasmuch as individual drivers made a practise of locating the mirror at different places crosswise of the automobile as best suited the ideas of the particular person. At the present time, however, the location of the mirror has become standardized and is restricted practically to the center of the windshield or other place on the automobile midway of the width thereof so that a fixed horizontal angle answers all the requirements of the driver, thereby eliminating horizontal adjustment and necessitating only a vertical adjustment of the same in order to suit the height of the driver. By means of such vertical adjustment the operator can at any time raise the mirror or lower the same in order to enable him to bring the image in line of his vision and it also permits the operator to turn the mirror vertically into such a position during night driving that the head lights of cars in rear will not be reflected and throw a glare into the eyes of the driver.

It is, therefore, the object of this invention to provide a mirror bracket of simple and durable construction which will efficiently support the mirror in its proper position on the windshield or the support and hold the same reliably in a definite, horizontal, angular position but permit of readily and easily adjusting the same vertically to suit the driver.

In the accompanying drawings:—

Figure 1, is a front elevation of a mirror bracket embodying a practical form of our invention.

Figure 2, is a side elevation of the same.

Figure 3, is a top plan view thereof.

Figure 4, is a perspective view of the head portion of the bracket.

Figure 5, is a similar view of the hanger forming part of the bracket.

Figure 6, is a rear elevation of the head of the bracket showing a slightly modified form of the same as compared to the construction shown in Figs. 1-4.

Figure 7, is a vertical section taken on line 7—7, Fig. 6.

Figure 8, is a top plan view of the bracket, shown in Figs. 6 and 7.

Figure 9, is a perspective view thereof.

Similar characters of reference indicate like parts throughout the several views.

Referring to the organization of our mirror bracket shown in Figs. 2-5, the numeral 10 represents the main portion or body of the bracket head, which is preferably constructed in the form of a plate from a sheet of metal and is adapted to be arranged in rear of the mirror 11 which is to be supported by the bracket. This mirror may be attached to this plate in any suitable manner but preferably by means of upper and lower hooks 12, 13 arranged at the upper and lower edges of the head plate 10 and adapted to engage over the upper and lower edges of the mirror and clamping screws 14 working with thread openings in the head plate 10 and engaging with the rear side of the mirror so as to press the same forwardly against the overhanging portions of the hooks 12 and 13 and thereby hold these parts against displacement relatively to each other.

Projecting rearwardly from the head plate 10 are two pivot lugs or ears 15 which are preferably stamped out of the body of this plate from the material located within the marginal portion thereof and then bent rearwardly leaving openings 16 on the central part of this plate which renders the same light and thereby modifies the vibration of the bracket accordingly. In order to hold the pivot lugs 15 rigidly in place relative to each other and prevent the same from yielding when inward pressure is applied thereto by the means which pivotally connect the same with the hanger and the bracket, bracing means are provided which preferably comprise two braces 17, 17 which are formed on the head plate 10 and engage with the inner side of the pivot lugs 15. These braces are preferably formed at opposite ends of a flange 18 which is formed integrally with the head plate at the upper edge thereof and bent rearwardly and downwardly so as to bring the extremities of the braces into engagement with the inner side of the pivot lugs. For the purpose of increasing the strength and stiffening effect of the braces 17 the rear ends of the same are connected by a cross bar 19 which latter together with the extremities of the braces 17 is curved downwardly slightly so as to conform with the rounded rear ends of the pivot lugs 15. By this means the braces 17, 17 and the cross bar 19 form a spacer or retainer between the pivot lugs which hold the latter reliably in position when subjected to inward pressure by the means which pivotally connect the same with the hanger and hold the same in various positions into which the same may be turned vertically.

The hanger in the present instance comprises a horizontal cross bar 20 which is adapted to be secured with its rear side by means of screws 21 or otherwise to the upper rail 22 of the windshield of an automobile or other available part thereof, and two forwardly and downwardly projecting supporting arms 23, 24, the lower ends of which engage with the outer sides of the pivot lugs 15, 15 at the rear ends of the latter. Means are provided for pivotally connecting the lugs of the bracket head and the arms of the hanger and also permit of securely clamping these parts so that they are reliably held into whatever position they may be adjusted. The preferred means for this purpose consisting of a bolt 25 passing horizontally and lengthwise through the companion pairs of pivot lugs 15 and supporting arms 23, 24 one end of this bolt being provided with a head 26 which engages with the outer side of the pivot arm 23 while the other end of the same is provided with a winged screw nut 27 engaging with the outer side of the other pivot arm 24. Upon tightening this clamping and pivot bolt the pivot arms are securely clamped against the outer side of the pivot lugs 15 and the latter are in turn clamped or pressed against the braces 17, 17 at opposite ends of the cross bar 19 whereby a rigid and reliable connection is formed between the supporting head and the hanger of the bracket. The clamping bolt is preferably tightened to such an extent that the frictional engagement of the hanger arms and the head lugs will be sufficiently strong to hold these parts reliably in position and prevent vertical displacement of the mirror and bracket head due to vibration of the car when the same is in use. This frictional engagement of these parts, however, should be so determined that it will still be possible for the operator or driver to turn the bracket head downwardly or upwardly to bring the image into the line of vision of the driver and also permit him when necessary to raise the mirror and thereby prevent the glare of headlights in rear of the car from striking the eyes of the driver during night driving. This friction connection is of such a character that vertical adjustment of the mirror by the driver will not disturb the degree of such friction and thereby avoid the necessity of frequent readjusting the clamping bolt to secure the right friction for holding the mirror in its proper place. This is best obtained by making the body of the clamping bolt 25 adjacent to its head 26 square, as shown at 28 and constructing the opening 32 in the adjacent arm 23 of corresponding form so as to prevent this bolt from turning in these openings, as shown in Figs. 3 and 5.

In order to bring the mirror at the proper horizontal angle which will permit the driver to see the image in rear of the car, one of the arms of the hanger is made comparatively short and the other comparatively long so that when the mirror supporting head is mounted thereon the mirror will be arranged at an angle horizontally relatively to the windshield or other part upon which the same is mounted. In the case of a bracket which is intended for use on an automobile having a left hand drive, the left hand supporting arm 23 is made comparatively short and the right hand arm 24 is made comparatively long, as shown in Figs. 2, 3 and 5. Upon mounting the bracket head on these arms this head will be arranged at an angle to the base or cross bar 20 of the hanger which is attached to the windshield bar 22 and thereby support the mirror in a horizontally angular position with reference to the place occupied by the driver. Inasmuch as it is now the general custom of mounting the rear view mirrors on the central part of the windshield frame or other adjacent support provided on the car midway of its width it is possible to employ a definite angular position of the mirror bracket relatively to its support which will suit all requirements of the driver and, therefore, avoid the necessity of any horizontal adjustment for this purpose. In the present case, therefore, the pivot arms of the hanger and the pivot lugs of the supporting head are pivotally connected with each other on a definite and fixed axis which is incapable of adjustment in a horizontal direction. The present mirror bracket, therefore, supplies all the necessary requirements for properly supporting a rear view mirror in an automobile in accordance with a standard practice and the same, therefore, only needs a good frictional contact at its horizontal axis so that it can be placed in any position and remain set without liability of loosening or tightening any screws and still permit of raising and lowering the mirror by simply grasping the mirror or its head by hand and turning it into the desired position.

By making the pivot bolt square on one end it is prevented from rotating with the mirror and once it is adjusted to give the necessary frictional contact it will remain in this position permanently or at least until the same has become loose by wearing.

By establishing a permanent horizontal angle for the rear view mirror there is no possibility of its being moved accidently by being hit or bumped except in a vertical direction and if so disturbed it can be restored easily and readily with one hand. This construction, therefore, is advantageous over the rear view mirror brackets as heretofore constructed which required the use of both hands in order to effect an adjustment of the mirror which necessitated stopping of the car in order to enable the driver to make the necessary adjustment. It is obvious, therefore, that the present mirror bracket is advantageous by reason of the fact that its permanent horizontal angle permits the mirror to be adjusted while the car is in motion.

Instead of bracing and spacing the pivot lugs and the bracket head relatively to each other by the means which are shown in Figs. 1 and 4 such means may be modified in accordance with the structure shown in Figs. 6-9. In this modified construction two braces 29, 29 are stamped or punched out of the lower part of the head plate 10 so as to form openings 30 therein which braces are bent upwardly so that they engage the inner sides of the pivot lugs 15 and thereby support the latter against inward deflection under the pressure of the pivot or clamping bolt in substantially the same manner in which this is accomplished in the structure previously described. In this modified form the outer extremities of the braces 29, 29 are not connected with each other by means of a cross bar but the same are made considerably wider so as to compensate for the absence of such a cross bar and operate to reliably sustain the pivot lugs 15 against inward pressure. By forming the braces 29, 29 from the stock of the sheet of metal which forms the bracket head 10 a blank of smaller area can be used as compared with that shown in Figs. 1-4, thereby reducing the amount of material used in the making of the bracket head and effecting a corresponding economy in construction.

For the purpose of strengthening the plate 10 the same may be provided on its central part with a rearwardly deflected area, panel or bead 31, as shown in Figures 1-4, thereby stiffening the same and preventing the glass plate which it supports from being deflected to such an extent as would be liable to break the same.

We claim as our invention:—

1. A mirror bracket comprising a hanger adapted to be mounted on a support and a head adapted to be attached to a mirror, said head including a plate of metal adapted to be arranged in rear of the mirror, pivot lugs stamped out of the body of said plate within the margin thereof and projecting rearwardly, braces formed integrally with a longitudinal edge of said plate and projecting rearwardly therefrom into engagement with the inner sides of said lugs, a cross bar connecting said braces, and clamping means connecting said lugs and drawing the same against said braces and pivoting the same to said hanger.

2. A mirror bracket comprising a hanger adapted to be mounted on a support and a head adapted to be attached to a mirror, said head including a plate of metal adapted to be arranged in rear of the mirror, pivot lugs stamped out of the body of said plate within the margin thereof and projecting rearwardly, braces formed integrally with a longitudinal edge of said plate and projecting rearwardly therefrom into engagement with the inner sides of said lugs, a cross bar connecting said braces and formed integrally therewith and clamping means connecting said lugs and drawing the same against said braces and pivoting the same to said hanger.

WILLIAM LA HODNY.
FRANK X. KIBITZ.